United States Patent [19]

Hay, Jr. et al.

[11] Patent Number: 5,340,598
[45] Date of Patent: Aug. 23, 1994

[54] METHOD FOR PRODUCING SPHERICAL SHAPED BAKED GOODS

[75] Inventors: Richard C. Hay, Jr., Kinnelon; Chris Pappas, Ridgewood; Harry J. Bergstrom, Mendham; Richard D. Fazzolare, Randolph, all of N.J.

[73] Assignee: Nabisco, Inc., Parsippany, N.J.

[21] Appl. No.: 137,528

[22] Filed: Oct. 15, 1993

[51] Int. Cl.$^5$ ............................................. A21D 8/00
[52] U.S. Cl. .................................... 426/496; 426/467; 426/503; 426/523
[58] Field of Search ............... 426/496, 503, 518, 523, 426/467, 306; 99/474, 477; 126/21 A

[56] References Cited

U.S. PATENT DOCUMENTS

| | | | |
|---|---|---|---|
| 2,219,329 | 10/1940 | Engels | 426/467 |
| 3,149,976 | 9/1964 | Smith, Jr. | 426/467 |
| 3,984,578 | 10/1976 | Rohrl et al. | 426/523 |
| 4,293,572 | 10/1981 | Silva et al. | 426/94 |
| 4,349,574 | 9/1982 | Crothers | 426/496 |
| 4,381,697 | 5/1983 | Crothers | 99/443 C |
| 4,397,881 | 8/1983 | Crothers | 426/549 |
| 4,462,383 | 7/1984 | Henke et al. | 426/523 |
| 4,587,946 | 5/1986 | Doyon et al. | 426/523 |
| 4,623,545 | 11/1986 | Pivonka | 426/502 |
| 4,666,726 | 5/1987 | Pivonka | 426/502 |
| 4,679,542 | 7/1987 | Smith et al. | 126/21 A |
| 4,865,862 | 9/1989 | McFeaters et al. | 426/496 |
| 4,865,864 | 9/1989 | Rijswijck | 426/523 |
| 4,963,375 | 10/1990 | Sato et al. | 426/523 |
| 4,976,978 | 12/1990 | Schubert | 426/516 |
| 5,077,074 | 12/1991 | Van Lengerich | 426/503 |
| 5,110,610 | 5/1992 | Cummins | 426/496 |
| 5,123,830 | 6/1992 | Papalexis | 426/518 |
| 5,246,721 | 9/1993 | Kerkonian | 426/279 |

FOREIGN PATENT DOCUMENTS

| | | |
|---|---|---|
| 2446581 | 4/1976 | Fed. Rep. of Germany . |
| 2409006 | 6/1979 | France . |
| 462897 | 3/1937 | United Kingdom . |

OTHER PUBLICATIONS

Cereal Technology, Samuel A. Matz, Ph.D., AVI Publishing Company, Inc. 1970, pp. 56–59, 243 and 245.
Cookie and Cracker Technology, Samuel A. Matz, Ph.D., AVI Publishing Company, Inc. 1968, pp. 155–157, 163–164, 174–178.

Primary Examiner—George Yeung

[57] ABSTRACT

Spherical baked goods, such as, cookies, crackers and snacks, are produced on a mass production basis by feeding a farinaceous dough or other food composition to one or a plurality of dies which shape it into ropes. The shaped extrudate ropes obtained from each die are cut by a cutting means, such as, a reciprocating cutter, which severs and shapes the rope into substantially spherical, cylindrical or rounded pieces. The doughs which are cut into substantially spherical, cylindrical or rounded pieces can be raw, partially cooked or baked, or fully cooked. A spherical or rounded shape is maintained or obtained upon subsequent baking or leavening of the substantially spherical dough pieces by continuously moving them relative to the oven conveyer so as to avoid flattening of the dough piece due to spreading. The baked pieces are sufficiently rounded or spherical so as to permit continuous application of confectionery coatings of substantially uniform thickness by pan coating techniques.

13 Claims, No Drawings

METHOD FOR PRODUCING SPHERICAL SHAPED BAKED GOODS

FIELD OF THE INVENTION

The invention relates to the production of coated, spherical baked goods, such as, cookies, crackers and snacks.

BACKGROUND OF THE INVENTION

In some commercial schemes, fermented dough is dropped into a divider hopper, which cuts the dough into loaf-sized pieces. The dough is then forced into pockets of a divider having a known volume. The pocket contents are cut off from the main dough mass. The dough pieces of constant volume are ejected onto a conveyor leading to a rounder. The dough pieces leaving the divider are irregular in shape with sticky cut surfaces from which the gas can readily diffuse. The rounder close the cut surface, giving each dough piece a smooth and dry exterior. A relatively thick and continuous skin is for=ned around the dough piece. The rounder shapes the dough into a ball for easier handling in subsequent steps. The rounder performs its functions by rolling the flouted dough pieces around the surface of a drum or cone, moving it upward or downward along this surface by means of a spiral track. As a result of this action, the surface of the dough pieces is dried both by the even distribution of dusting flour and by dehydration resulting from exposure to air. The dough pieces assume an approximately spherical shape. After being allowed to rest, the dough pieces are conveyed to a molder. See: *Matz, Samuel A.,* "Cereal Technology", (1970), pages 56 to 59; and *The New Encyclopedia Britannica,* Macropaedia, Volume 2, (1974), page 601.

Rounders can be classified as bowl-, drum-, or umbrella-type. The conical or bowl variety consists of a rotatable cone-shaped bowl around the interior of which is placed a stationary spiral track or race. From the conveyor leading from the divider the dough pieces fall into the feed hopper of the rounder and then drop to the bottom of the rotating bowl. The pieces are tumbled and rolled along the dough race until they emerge from the top of the bowl and fall onto the belt leading to the intermediate proofer. A second type of rounder is the so-called umbrella or inverted cone variety. These machines differ from the preceding type in that the dough piece is carried along the outside surface of a cone which has its apex facing upward. The third type of rounder is the drum rounder. This machine differs from the bowl and umbrella styles in that the cone segment has very little slope to its sides, i.e., the sides are almost vertical. The dough piece enters near the bottom of the drum and rolls upward. In addition to their form, rounding machines may vary in the texture or composition of the rotating surface, in the means provided for adjusting the relationship of the dough race to the drum or cone, in the method of applying dusting flour, etc. The rotating surface is usually corrugated vertically or horizontally, but the design and the size of the ribs vary considerably from one manufacturer to another. The surface may be waxed or it may be coated with a plastic such as Teflon to reduce sticking.

U.S. Pat. No. 5,110,610 discloses a dough piece rounder for shaping dough pieces. A mass of dough is made into uniform pieces of equal weight. The dough pieces are deposited onto an endless air impervious flexible belt. The belt conveys the pieces to a dough shaping apparatus. The dough pieces are shaped into a desired shape. The belt is supported and cooled by a perforated plate deck lying just underneath at least a portion of the belt. Air is discharged from the perforated plate deck to provide a film of air between the plate deck and the belt to reduce the friction therebetween and to carry away heat from any friction heat generated. The dough pieces can be formed into spherical shapes by the apparatus of the patent.

U.S. Pat. No. 5,147,669 discloses edible articles for ingestion. The edible articles comprise an edible cookie bit defined by a mixture of flour, sugar and shortening baked into a predetermined size and into a predetermined shape. The surface of the cookie bit has a characteristic for absorbing an edible foodstuff into at least a portion of the surface while retaining the predetermined shape. The predetermined structural characteristic of the cookie bit is defined by the ability of the edible cookie bit for absorbing the foodstuff and retaining the structural integrity of the edible cookie bit. The edible foodstuff for coating the surface without compromising the predetermined shape, covers the edible cookie bit so that the surface is not visible in the finished edible article. The cookie bits have a count per pound of about 500 to about 3000.

U.S. Pat. No. 2,219,329 discloses using a fluidized bed to treat food materials. The patent discloses toasting discrete materials, such as, rice, wheat, corn flakes and potato chips, utilizing a fluidized bed to obtain a bubble surface.

U.S. Pat. No. 3,149,976 discloses using a fluidized bed to treat food materials. The patent discloses roasting granular organic material, such as, coffee beans, cocoa beans, peanuts and cereals, by controlled fluidization.

U.S. Pat. No. 4,623,545 discloses using a fluidized bed to treat food materials. The patent discloses receiving pieces of dough divided from a dough mass, sheeting the dough, passing the dough pieces over a fluidized bed while squeezing the pieces between a pair of rollers.

U.S. Pat. No. 4,666,726 discloses using a fluidized bed to treat food materials. The patent discloses a dough molding method wherein a piece of dough is caused to pass over a fluidized bed in its approach to a pair of sheeting rolls.

U.S. Pat. No. 4,276,978 discloses reshaping a cylindrical dough into a roundish shape and coating it, using a revolving drum to reshape the dough.

U.S. Pat. No. 4,349,574 relates to the shaping of cookie dough into conical pieces using a die roll. The conical pieces are laid on their side and baked on a conveyer in an oven so that all baked surfaces are rounded. Panning and handling are facilitated by the shape. Cylindrical or frustroconical shapes can also be used. However, according to the patent spherical cake or cookie products are inherently 10 difficult to make.

U.S. Pat. Nos. 4,381,697 and 4,397,881 are similar to U.S. Pat. No. 4,349,574. U.S. Pat. No. 4,381,697 discloses using a die roll to produce cone-shaped cookie dough bits which are transferred by conveyors to an oven conveyor for baking to form cookies. U.S. Pat. No. 4,397,881 discloses using a die roll to shape cookie dough into a part cylindrical, part conical configuration. Spherical cake or cookie products, it is disclosed, are inherently difficult to make. The shaped dough pieces are baked on an oven conveyor.

U.S. Pat. No. 4,293,572 relates to the coating of baked or fried products. The patent discloses coating baked or fried products with a moisture barrier by dipping, spraying, brushing or a water fall.

U.S. Pat. No. 4,976,978 discloses a method of reshaping deformable food material, such as dough, by rolling said pieces in the presence of particulate coating material in a revolving drum, thereby reshaping the pieces into roundish, coated bodies.

The following patents relate to the use of heated streams in a baking chamber. However, fluidation of dough pieces to reshape and leaven them into roundish pieces is not taught in them:

U.S. Pat. No. 3,984,578 discloses baking food in a closed space in which heated air is circulated. The temperature is varied in a saw-tooth fashion to minimize soiling of the cooking space.

U.S. Pat. No. 4,462,383 discloses baking bread, cookies, etc., in which high velocity, heated air is impinged against the food product.

U.S. Pat. 4,587,946 discloses baking food in an oven while circulating heated air with a fan to obtain substantially uniform baking throughout the oven.

U.S. Pat. No. 4,679,542 discloses cooking food by conveying the same through an oven while heated air is forced through the oven and impinges the food.

U.S. Pat. No. 4,865,864 discloses an air heated oven wherein food pieces are placed in a foraminous basket and heated air flows through the basket and heats the food pieces.

U.S. Pat. No. 4,963,375 discloses cooking foods in an oven while controlling the air flow rate in the oven.

British Patent No. 462,897 discloses regenerating bakery products by subjecting the products to the action of freely circulating heated air.

German Patent No. 2,446,581 discloses a baking process which utilizes a moving stream of hot air.

French Patent No. 2,409,006 discloses a baking chamber utilizing circulating air.

The present invention provides a process for continuously mass producing spherical baked goods while avoiding flattening of the dough pieces due to oven spreading. The leavened products are sufficiently spherical so as to enable continuous application of uniform confectionery coatings by pan coating without sticking of the pieces to each other during coating.

SUMMARY OF THE INVENTION

An object of the invention is to provide a method for the production of coated, spherical baked goods, such as, cookies, crackers and snacks on a mass production basis. The baked goods may be elliptical in cross section, egg-shaped or jelly bean shaped, or have other rounded shapes which are essentially absent of flat portions formed by contacting a heated flat surface during baking.

The objects and advantages of the invention are achieved by the process of the invention.

Some embodiments of the invention deal with a baking process where a dough forming device is used for shaping dough in a cylinder with the girth approximately equal to the length. The formed dough pieces are conveyed into a fluidized hot air stream, for example, where they are baked for a specific length of time yielding a spherical/ellipsoidal finished sweet good product. A channeled pan (shaker pan) having a cam with a back and forth motion to the direction of travel is used to help keep the pieces moving in relative motion to their forward (conveyor) motion through the baking unit. This is exemplary of the broader process and features of the invention method.

The invention involves a method for the production of spherical baked goods. The method involves: (a) feeding a farinaceous based dough through at least one die to obtain at least one cylindrically shaped extrudate dough rope; (b) cutting each of the cylindrically shaped extrudate ropes to obtain substantially spherical dough pieces; (c) conveying the substantially spherical dough pieces through an oven by means of a conveyer while moving the substantially spherical dough pieces relative to the conveyer so as to promote the production of spherical dough pieces; and (d) heating the spherical dough pieces while moving the spherical dough pieces relative to the conveyer to leaven the spherical dough pieces into spherical baked goods.

Optionally the spherical baked goods can be coated with an edible composition.

The invention provides a method for the mass production of baked products, such as cookies, crackers, and snacks from dough pieces which when baked retain or form a baked product having a substantially spherical or rounded shaped so as to enable it to be substantially uniformly and continuously pan coated with a confectionery coating. The round coated products may be produced using one or more multi-orifice extruders to increase production rates, reciprocating cutters to form cylindrical or rounded dough pieces, and a fluidized bed baking oven to bake the dough pieces into a round or spherical shape.

The invention provides for the production of rounded or spherical baked goods such as cookies, crackers, and snacks, which are pan coated with a confectionery coating on a mass production basis. A farinaceous-based dough is fed to one, or preferably a plurality of dies which shape the dough composition into at least one shape conforming to the orifices of the dies. The shaped extrudate rope obtained from each die is cut by a blade, wire or the like to provide substantially spherical or cylindrical dough pieces.

The substantially spherical dough pieces are conveyed through an oven by means of a conveyer while moving the substantially spherical dough pieces relative to the conveyer so as to promote the production of spherical dough pieces. The spherical dough pieces are heated while moving the spherical dough pieces relative to the conveyer to leaven the spherical dough pieces into spherical baked goods.

The use of a multi-port extrusion die permits higher mass flow rates and thus greater dough piece production rates at lower cutter speeds. The use of lower cutter speeds increases accuracy of cutting. The larger the number of die orifices at a given production rate, the slower is the rate of flow through each orifice. Deformation of the individual pieces is also reduced by decreasing the speed at which they impact equipment parts upon being cut. In addition, the use of multiple orifices permits the use of lower pressure for a given production rate which positively impacts the texture of the final product. The plurality of dies can be fed by a calendar press or preferably an extruder, most preferably an extruder with a plurality of conveying screws.

The doughs which pass through the dies for cutting into spherical pieces can be raw, partially cooked or baked, or fully cooked or baked or expanded. The raw doughs, partially cooked doughs, or glassy half-products can be heated subsequent to cutting into spherical or rounded shapes by continuously preventing the pieces from obtaining a flattened bottom during transport to a baking oven and during baking. This can be accomplished by means of vibratory conveyers and a fluidized bed heater. Fully cooked or baked doughs can be cut and shaped into rounded or spherical pieces while still in a plastic state.

In embodiments of the invention, the extrudate dough rope can be cut just prior to or during substantial expansion or puffing of the dough, such as, in the production of snacks. In the production of cookie and cracker-type products, for example, the dough is preferably cut prior to any substantial expansion. The cut, essentially raw dough can then be transferred by a conveyor belt to an oven for baking and leavening into spherical or rounded baked goods.

Conventional snack, half-product, cracker and cookie compositions may be used in producing the spherical or rounded food products of the present invention. However, in the production of the spherical products, such as cookies, gluten is preferably included in the cookie dough to promote and retain a spherical shape during machining and baking. Also, in the production of spherical crackers, the amount of water and an enzyme composition comprising one or more proteolytic enzymes are preferably used to: (a) increase the expandability or leavening ability of cracker doughs and (b) reduce cracker hardness which can result upon baking cracker doughs which have undergone high extrusion pressures.

High extrusion pressures tend to change the air cells in a dough. Generally the greater the pressure the lesser the degree of expansion upon subsequent baking and the harder the texture of the cracker. It has been found that cracker doughs having: (1) a water content of from about 15 percent to about 35 percent by weight, preferably from about 17 to about 21 percent by weight, most preferably from about 18 to about 20 percent by weight, of the dough, and (2) from about 9 to about 20 grams, preferably from about 11 to about 17 grams, of proteolytic enzyme per 100 pounds of the flour are extrudable doughs which retain their shape during transport to baking ovens and are bakeable into a tender cracker.

The use of an emulsifier, such as, sodium stearyl lactylate, and a chemical leavening agent, such as, ammonium bicarbonate, also promote a tender texture in the spherical crackers or cracker-like products of the invention.

DETAILED DESCRIPTION OF THE INVENTION

The present invention provides a process for making cookies having a substantially spherical, or egg or jelly bean shape by extruding a cookie dough in the form of a strand or rope, cutting the dough to a desired shape, baking the dough in a fluidized bed to leaven it wherein the dough assumes and retains an oval or rounded shape, and optionally coating the baked product. Spherical crackers and snacks may also be produced in the process of the present invention.

The apparatus preferably comprises an extruder which feeds a dough through an optional elbow to a die head or die plate which is located at the bottom end of the optional elbow. In the production of crackers, the extruder may be a modified pretzel extruder containing one or more sets of individual, non-intermeshing screws for feeding dough through the elbow to the die head. A hopper is used to feed the dough to the extruder screws.

In embodiments of the invention, the cookie dough, cracker dough or other dough may be fed to the die head or die plate by means of a continuous mixer, or counter-rotating rolls, such as those of a calendar press, instead of by an extruder. An extruder is the preferred means for feeding the dough through the dies.

The dough can be produced in at least one mixing apparatus such as a batch mixer, continuous mixer, or extruder, and then transferred to the forming or shaping extruder via the hopper. In other embodiments of the invention, the dough ingredients can be added to and mixed to form a dough within an extruder or continuous mixer having a plurality of dies which are in association with the reciprocating cutting means.

In the production of partially cooked products, half-products, or fully expanded products such as snacks, a cooker extruder is preferably used to cook and feed the food composition to the die head.

Known convection ovens, band ovens, microwave ovens, radio frequency ovens, fryers or oil baths, fluidized bed heaters, jet zone ovens or combinations thereof, such as, a serially arranged microwave oven and a jet zone oven, can be used in the invention. These devices can be used, for example, to bake raw or partially cooked doughs which have been cut into spherical or rounded shapes. Spherical half products can, for example, be puffed or expanded by means of a microwave oven, jet zone oven, fryer or combinations thereof.

Formulations And Processing

Conventional formulations and extruder processing conditions can be used in the production of spherical or rounded crackers, cookies, expandable or puffable glassy matrix half-products, snacks and biscuits. However, it is preferable to include gluten, such as vital wheat gluten in the formulations in amounts which promote the formation and retention of a spherical or rounded shape in the dough piece during cutting of the dough into pieces, during transport of the pieces and during baking of the pieces. Exemplary amounts of added gluten range up to about 10% by weight, preferably from about 2% to about 7% by weight, based upon the weight of the flour.

The flour component can be any comminuted cereal grain or edible seed meal, derivatives thereof and mixtures thereof. Exemplary of the flour components which can be used are wheat flour, corn flour, oat flour, barley flour, rye flour, rice flour, potato flour, grain sorghum flour, corn starch, physically and/or chemically modified flours or starches, such as, pregelatinized starches, and mixtures thereof. The flour can be bleached or unbleached. Wheat flour or mixtures of wheat flour with other grain flours are preferred. The amount of flour used in the cookie compositions of the invention ranges, for example, from about 30 to about 70 percent by weight, preferably from about 45 to about 55 percent by weight. Unless otherwise indicated, all weight percentages are based upon the total weight of all ingredients forming the doughs or formulations of the invention except for inclusions such as flavor chips, nuts, raisins and the like. Thus, "the weight of the dough" does not include the weight of inclusions.

The flour can be replaced in whole or in part by flour substitutes or bulking agents, such as, polydextrose, hollocellulose, microcrystalline cellulose, mixtures thereof, and the like. Corn bran, wheat bran, oat bran, rice bran, mixtures thereof, and the like, can also be substituted in whole or in part for the flour for making a fiber enriched product, to enhance color, or to affect texture.

Corn flour and/or wheat bran can be used, for example, to enhance color and affect texture. Exemplary amounts range up to about 15 percent by weight corn flour and up to about 20 percent by weight wheat bran, the percentages being based upon the total weight of ingredients forming the dough. Preferably, the corn flour and wheat bran will each comprise from about 1 to about 10 percent by weight, more preferably from about 2 to about 5 percent by weight, based upon the weight of the dough.

The shortening or fat used in the invention can be any edible fat or oil or mixture thereof suitable for baking applications and can include conventional food-grade emulsifiers. Vegetable oils, lard, marine oils and mixtures thereof which are fractionated, partially hydrogenated, and/or interesterified are exemplary of the shortenings or fats which can be used in the invention. Edible reduced or low calorie, or non-digestible fats, fat substitutes, or synthetic fats, such as sucrose polyesters which are process compatible, can also be used. The shortenings or fats can be solid or fluid at room temperatures of from about 75° to about 90° F. The use of components which are solid or semi-solid at room temperatures are preferred so as to avoid possible oil seepage from the final product during storage.

Generally, in the production of cookies, the amount of the shortening or fat component admixed with the flour component is, for example, at least about 12 percent by weight, and can, for example, go up to about 40 percent by weight, based upon the weight of the dough. It preferably ranges from about 20 to about 30 percent by weight, based upon the weight of the dough.

Exemplary emulsifiers which can be used include lecithin, sorbitan monostearate, mono- and/or di-glycerides, polyoxyethylene sorbitan fatty acid esters, such as, polysorbates (e.g., polyoxyethylene (20) sorbitan monostearate), and sodium stearoyl-2-lactate. Exemplary amounts are up to about 3 percent by weight of one or more emulsifiers based upon the weight of the flour.

Process compatible ingredients which can be used to modify the texture of the products produced in the invention include sugars, such as, sucrose, fructose, lactose, dextrose, galactose, maltodextrins, corn syrup solids, hydrogenated starch hydrolysates, protein hydrolysates, mixtures thereof, and the like. Reducing sugars, such as, fructose, maltose, lactose, and dextrose or mixtures of reducing sugars, can be used to promote browning. Fructose is the preferred reducing sugar because of its ready availability and its generally more enhanced browning and flavor development effects. Exemplary sources of fructose include invert syrup, corn syrup, high fructose corn syrup, molasses, brown sugar, maple syrup, mixtures thereof, and the like.

The texturizing ingredient, such as, sugar can be admixed with the other ingredients in either solid or crystalline form, such as, crystalline or granulated sucrose, granulated brown sugar or crystalline fructose, or in liquid form, such as, sucrose syrup or high fructose corn syrup. Humectant sugars, such as, high fructose corn syrup, can be used to promote chewiness in the baked product.

In embodiments of the invention, the total sugar solids content, or the texturizing ingredient content, of the cookie doughs of the invention is, for example, at least about 10 percent by weight, and can, for example, go up to about 40 percent by weight, based upon the weight of the dough. It preferably ranges from about 20 to about 30 percent by weight, based upon the weight of the dough.

Crystalline or granulated sucrose alone or with other sugars is preferred in the invention. The sucrose content can, for example, be at least about 80 percent by weight, based upon the total sugar solids content of the cookie dough. The balance of the sugar solids can comprise fructose, dextrose, lactose, or mixtures thereof, for example. Sugar granulations which can be used range, for example, from about 4X to about 12X.

The moisture contents of the doughs of the invention should be sufficient to provide the desired consistency to enable proper forming, machining, and cutting of the dough. The total moisture content of the dough compositions of the invention will include any water included as a separately added ingredient, as well as the moisture provided by flour (which usually contains about 12 to about 14 percent by weight moisture), and the moisture content of other dough additives included in the formulation, such as, high fructose corn syrup, invert syrups or other liquid humectants.

Taking into account all sources of moisture in the dough-like mixture including separately added water, the total moisture content of the cookie doughs which can be used in the invention is generally less than about 20 percent by weight based upon the weight of the dough.

In addition to the foregoing, the doughs can include other additives conventionally employed in cookies. Such additives can include, for example, milk by-products, egg or egg by-products, cocoa, vanilla or other flavorings, as well as inclusions such as nuts, raisins, coconut, flavored chips such as chocolate chips, butterscotch chips and caramel chips, and the like.

A source of protein which is suitable for inclusion in baked goods can be included in the dough compositions of the invention to promote Maillard browning. The source of protein includes non-fat dry milk solids, dried or powdered eggs, mixtures thereof, and the like. The amount of the proteinaceous source can, for example, range up to about 5 percent by weight, based upon the weight of the dough.

The dough or dough-like cookie compositions of the invention can contain up to about 5 percent by weight of a leavening system, based upon the weight of the dough. Exemplary of chemical leavening agents or pH adjusting agents which can be used include alkaline materials and acidic materials such as sodium bicarbonate, ammonium bicarbonate, sodium acid pyrophosphate, tartaric acid, mixtures thereof, and the like.

The cookie doughs can be produced in conventional or known manner and formed into a continuous cylindrical rope by the use of a round shaped die orifice. The continuous rope can be cut into pieces using known reciprocating cutters, such as, those disclosed in U.S. Pat. Nos. 4,534,726, 4,578,027 and 4,685,878.

Filled products may be produced in accordance with the invention by coextruding the dough with filler materials. The coextrudate can be formed by the use of a concentric die or a tube inserted within the die orifice. Filled products can also be produced by transporting the dough to a conventional enrobing or encrusting machine, such as those produced by the Rheon Manufacturing Company for filling with a filler material.

Examples of fillers which can be used include chocolate, vanilla, butterscotch, fruit, peanut butter and cheese-flavored fillings. The filling material can also be a separately produced dough for the production of multi-flavored, multi-colored, or multi-textured cookie, cracker or snack products.

Partially baked, leavenable cookie doughs produced by extrusion cooking, such as, disclosed in U.S. Pat. Nos. 5,015,489 and 5,015,488, can be cut into spherical pieces, then leavened into spherical cookies, followed by pan coating in accordance with the invention.

The crackers of the invention can be of the fermented type as well as of the unfermented or chemically leavened type. However, in the production of crackers by extruding a raw dough and cutting it into substantially spherical dough pieces for subsequent baking and leavening it has been found that the high pressures used to extrude the uncooked dough through the dies tends to adversely affect the shaping of the dough pieces and their baking characteristics.

It is believed that the high pressure exerted upon the cracker dough upon extrusion from the dies changes the distribution, size or shape of air cells in the dough in a manner which can adversely affect the baking characteristics of the dough. In the production of spherical crackers from extruded dough pieces it is preferred to control dough viscosity and elasticity to provide high dough shapeability and definition upon extrusion, as well as proper baking characteristics after extrusion. Proper baking characteristics include leavening of the dough while retaining high shape definition, and a tender texture in the final baked good.

The extrudable cracker doughs of the invention preferably contain an enzyme composition for controlling dough viscosity or consistency for shaping, expansion and achievement of a tender texture. The enzyme composition comprises proteolytic enzymes, which can be in combination with an amylase. It is believed that the proteolytic enzymes weaken the gluten network which results in a more pliable, extensible dough. This improves extrudability and cuttability and aids expansion upon baking of the shaped dough pieces. The proteolytic enzyme also improves tenderness of the baked product. The amylase is believed to partially hydrolyze the starch prior to baking causing a reduced degree of gelatinization of starch which tends to improve the texture of the baked products. In addition, the amylase reduces the viscosity of the dough, which improves extrudability.

Starch gelatinization occurs when: (a) water in a sufficient amount, generally at least about 30 percent by weight, based upon the weight of the starch, is added to and mixed with starch, and (b) the temperature of the starch is raised to at least about 60° C. (140° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in properties such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al., "The Terminology And Methodology Associated With Basic Starch Phenomenon," *Cereal Foods World*, Vol. 33, No. 3, (March 1988), pages 306 to 311. In the production of crackers in accordance with the invention, excessive starch gelatinization is avoided to obtain a long lasting, tender, non-brittle texture in mass produced spherical crackers. The shelf-stable texture lasts for at least about two months, preferably at least about six months, when the products are packaged in closed containers.

The amount of enzyme used will depend upon the enzyme concentration, and activity of the enzymes. In preferred embodiments of the invention, the enzyme composition may have a proteolytic activity of from about 365 to 385 Nu/g (Northrop Value). The total amount of enzymes can be from about 9 to about 20 grams, preferably from about 11 to about 17 grams per hundred pounds of flour. The source of the proteolytic enzymes can be papain or microbial, or mixtures thereof. Papain derived protease is preferred.

The farinaceous materials which can be subjected to the enzymatic treatment in accordance with the invention include bleached or unbleached flour, flour fractions, and mixtures thereof, starch, such as, corn starch, wheat starch, rice starch, potato starch, tapioca starch and mixtures thereof.

The flour which can be used in the crackers of the invention includes wheat, corn, rice, barley, rye, oat, potato, tapioca, graham and mixtures thereof. The preferred flours for making the baked comestibles of the invention are wheat flours and mixtures thereof with one or more other flour type, such as oat, rice or barley flour.

The amount of added water can also be used to control dough viscosity and baking characteristics. Generally as the amount of enzyme is increased, the amount of water can be decreased to achieve a desirable dough consistency and baking characteristics. The amount of water can range from about 15 to about 35 percent by weight, preferably about 17 to about 21 percent by weight, most preferably from about 18 to about 20 percent by weight, based upon the total weight of the dough in the production of crackers. The source of the added water can be pure water or a liquid source of water, such as, high fructose corn syrup.

The extrudable cracker doughs of the invention preferably contain at least one emulsifier to reduce cracker hardness and improve texture. Exemplary emulsifiers which can be used are sodium stearyl lactylate, lecithin, glycerol monostearate and other mono/diglycerides, or mixtures thereof. A preferred emulsifier is sodium stearyl lactylate. Exemplary total amounts of the emulsifier can range from about 0.05 to about 2 percent by weight, preferably from about 0.1 to about 1.0 percent by weight, most preferably from about 0.4 to about 0.8 percent by weight, based upon the total weight of the extrudable cracker dough. The emulsifier promotes cracker tenderness without over expansion.

Leavening agents can be used to promote a tender texture in the spherical crackers or cracker-like products of the invention. Exemplary leavening agents which can be used are sodium bicarbonate and ammonium bicarbonate and mixtures thereof. Exemplary amounts of leavening agents range from about 0.1 to about 5 percent by weight, preferably from about 0.6 to about 2 percent by weight, based upon the total weight of the dough. Food grade acidic compounds to control pH or effect leavening can also be included in the doughs of the invention.

Shortening or fat can be included in amounts which enhance cohesiveness of the dough without adversely affecting cracker texture and shape. Exemplary amounts of the shortening or fat or a fat replacement range from zero (0) to about 16 percent by weight, preferably from about 2 to about 6 percent by weight of the dough, not including topping oil. The baked cracker can be sprayed with topping or spray oil in conventional amounts, typically up to about 5 percent by weight of the cracker.

The shortening or fat which can be used in the preparation of the spherical crackers of the invention can be those conventionally used in the production of crackers. Exemplary shortening or fats which can be used are vegetable oils, lard, edible fat substitutes or replacements, mixtures thereof, and the like. Vegetable oils are preferred for use in the production of crackers in accordance with the invention.

One or more sugars can be used in the crackers of the invention to enhance flavor and browning. Exemplary amounts of the sugar are from about 2 to about 18 percent by weight of sugar solids, based upon the total weight of the cracker dough. Preferred amounts range from about 2 to about 8 percent by weight of the dough. The sugars can be monosaccharides, disaccharides or mixtures thereof. The preferred sugars are sucrose, high fructose corn syrup and mixtures thereof. High fructose corn syrup, as well as other reducing sugars, such as dextrose and lactose, can be used to enhance browning of the cracker.

Exemplary of the flavoring ingredients which can be included in the cracker doughs of the invention include yeast, yogurt, malt, salt and mixtures thereof. The optional flavoring ingredients can each be included in amounts ranging up to about 8 percent by weight, preferably from about 0-1 to about 1.5 percent by weight of the dough. The use of malt is preferred for flavor enhancement, browning and texturization. Amylytic enzymes in the malt tend to decrease dough viscosity and enhance leavening.

The extrudable cracker doughs of the invention can be produced by creaming together the flavoring ingredients such as salt and malt with the sugar, lecithin, emulsifier, shortening or fat, and the majority of the water to obtain a substantially homogeneous mixture. The flour and sifted sodium bicarbonate can then be admixed with the creamed mixture. The ammonium bicarbonate can be dissolved in water and then added to the mixture.

The enzymes can be used at temperatures and pH conditions normally recommended by their manufacturers or at conditions which are optimal for proteolytic and amylytic activities. The enzymes can be acidic, neutral, or alkaline.

Enzymes have optimal environments in which they function best. Care should be taken with enzyme treatment to create a suitable environment for the enzyme. The pH of the leavening agents is high so they preferably should not be admixed with the enzyme in a concentrated manner. For example, in producing an unfermented cracker the leavening agent is preferably well dispersed with the other ingredients prior to the addition of the enzyme.

If a plurality of enzymes are used, they preferably are separately added to the mixture rather than being mixed together prior to addition. The separate addition of the enzymes is preferred because it provides better control over the optimal pH and temperatures for a particular enzyme. The enzymes, if supplied in dry form, are preferably first admixed with a small quantity of the water prior to addition. The enzymes are admixed with the remaining ingredients to obtain a substantially homogeneous dough.

Excessive mixing times tend to result in doughs which are too soft and which expand excessively upon extrusion. Mixing times during the creaming stage generally range from about two to about five minutes. The flour and sifted sodium bicarbonate can, for example, be mixed for up to about two minutes prior to the addition of the ammonium bicarbonate and enzymes. The mixing time during the dough-up stage generally ranges from about 5 to 10 minutes, preferably about 6 to 8 minutes. Mixing temperatures can be from about 70° to about 120° F., preferably from about 85° to about 95° F.

The LFRA values of the cracker doughs of the invention can range from about 400 to about 900 grams for proper extrusion, shaping, and cutting. LFRA is an acronym for Leatherhead Food Research Association, the manufacturer of a texture analyzer. As used herein, it is the resistance to deformation of the dough to a 0.5 inch diameter ball probe moving at the constant rate of 2 millimeters per second for a set distance of 15 millimeters into the dough.

The lay time of the dough can be from about zero (0) hours to about eight hours, preferably from about 1.5 to about 2 hours. Generally, as the amount of enzyme is increased, the lay time can be reduced. For example, when high amounts of enzymes are used, the lay time can range up to about one-half hour.

The substantially homogeneous cracker dough can then be added to an extruder or to a calendar press comprising counter-rotating rollers which force the dough through dies to obtain extrudate ropes for cutting into cylindrical dough pieces in accordance with the present invention.

The extrusion pressure will depend upon the extruder size, number of dies, and the dough consistency. Exemplary extrusion pressures range from about 20 to about 500 psig, preferably less than 250 psig. High extrusion pressures tend to result in harder textured crackers. Extrusion temperatures can be from about room temperature or about 75° to about 125° F., preferably from about 80° to about 110° F.

The extruded, essentially uncooked or raw extrudate substantially cylindrical dough ropes can then be transported by conventional conveyor belts to a conventional reciprocating cutter. The cutter preferably severs the dough rope into cylindrical pieces having a length approximately equal to the rope diameter. The cutter also preferably rounds the ends of the dough pieces while they are being formed. The rounded dough pieces are transported from the conventional conveyer upon which they are formed to preferably a vibratory conveyer which is downwardly sloped in the direction of conveyance to promote rolling of the pieces while on the conventional conveyer belt. The pieces are continuously moved in a manner which prevents or avoids flattening of the dough piece surface during transport to and within a fluidized bed or jet zone oven for baking into spherical pieces. During baking in the oven, the dough pieces leaven and undergo Maillard browning.

The use of a fluidized bed oven is preferred because it tends to elevate or fluidize the cookie, cracker or other doughs during baking and thereby promotes retention or formation of a substantially uniform spherical or rounded shape which can be continuously pan coated to a substantially uniform coating thickness. The fluidized bed oven also facilitates leavening or expansion of the product without sticking to the conveyer or spreading of the product into a flattened bottom. Exemplary fluidized bed ovens which may be used are Type SR Jet Zone ovens equipped with an oscillating steel solid-pan conveyer.

In embodiments of the invention the cracker dough or other doughs can be produced in situ in an extruder or continuous mixer. In other embodiments, the dough can be separately produced in a mixing means such as, a continuous mixer, extruder, batch mixer or combinations thereof. The resultant dough can then be transferred from the mixing means to one or more extruders or one or more pairs of counter-rotating rolls or calendar presses equipped with dies for shaping the dough into extrudates which are cut into rounded or at substantially spherical dough pieces.

Conventional baking times and temperatures can be used in producing the spherical or rounded cookies, crackers and snacks of the invention. Exemplary baking times range from about 2 to about 15 minutes. Exemplary baking temperatures may be at least about 250° F., and may generally range from about 300° to about 600° F. The dough pieces can be topped with sugar, spray oil, salt or other conventional toppings before or after baking in known manner.

Compositions for producing glassy matrix spherical half products which are expandable or puffable into spherical puffed products can comprise up to about 100 percent by weight of at least one flour, from zero (0) up to about 18 percent by weight of at least one sugar, from zero (0) up to about 5 percent by weight of salt, from zero (0) up to about 20 percent by weight of at least one modified starch, and from zero (0) up to about 10 percent by weight of one or more flavoring and texturizing ingredients, based upon the total weight of dry ingredients. The amount of water admixed with the dry ingredients is such so as to achieve satisfactory gelatinization of the starch and substantial puffability after cutting. The amount of water can range from about 0.15 to about 1.0 pounds per pound of dry ingredients.

Exemplary glassy half product compositions which can be used in the invention comprise from about 71 to about 80 percent by weight of rice flour, from about 6.5 to about 7.5 percent by weight of sugar, from about 4.5 to about 15 percent by weight of modified starch, from about 1.6 to about 1.8 percent by weight of salt, from about 1.6 to about 1.8 percent by weight of malt, and from about 4.1 to about 4.5 percent by weight of flavoring, based upon the total weight of dry ingredients. These dry materials can be admixed with water to obtain, for example, a moisture content of about 28 to about 33 percent by weight, based upon the total weight of the dough composition.

Optionally the spherical baked goods of the invention can be coated with any conventional edible foodstuff coating composition for baked goods or confections. The coated spherical baked goods can be dried or heated for glazing, or the like, as needed. The coating can be a simple sucrose-water-stabilizer glaze to a coating of much more complexity.

The coating compositions often need to be applied at an elevated temperature, for example, 110° to 180° F., so that the coating composition is liquefied.

The coating can be applied to the surface of the baked product by any practical or conventional mechanical means, such as, dipping, spraying, brushing or a water fall. Pan coating is preferred. Any excess of the coating can be removed by any conventional or practical means such as air flowdown, mechanical vibration, or centrifuging. In the production of sugar-based coatings for example, sucrose, sometimes with corn syrup or other ingredients, is heated with a minor amount of water to make a sugar syrup. The heated syrup is sprayed or dribbled on a rolling mass of the spherical baked goods in a rotating drum called an enrober or coating reel. Heat may be applied to the reel. If necessary, the coated baked goods are then further dried in a belt dryer.

The spherical baked cookies can be coated with any conventional coating composition. For example, the coating can be a true chocolate (sweet or milk), or it can be a compound coating. The latter are based on hardened vegetable oils instead of cocoa butter. Compound coatings can be chocolate-flavored, white, or any color for which a suitable food dye is available. The principal ingredients in a coating usually are sugar and a fat. Corn syrup solids, flavors (such as cocoa), colors and emulsifiers may also be used. Moisture must be held to a very low level. The sugar should be finely powdered, with all particles preferably below $40\mu$ in their largest dimension. The fat must have a melting point above the highest temperature expected to be encountered before the product is to be consumed. Coconut oil fractions, hydrogenated cottonseed and soybean oils, or other hydrogenated vegetable oils can be used. The proportion of fat to solids, the melting point of the former, and the particle size of the latter, are major determinants of texture. The total amount of fat necessary to give the desired texture in vegetable coatings is related to the particle size of the sugar. Although it is perfectly feasible to make acceptable coatings using pre-ground sugar, the texture (smoothness) of the coating will be insured by refining (i.e., grinding on roller mills) even when coarse sugar is used.

The amount of coating applied to a piece should, ideally, be governed by the eating quality of the finished cookie. Since the coating is almost always considerably more expensive per unit weight than the coated base, often the amount of coating is reduced to a minimum. However, they are preferably of sufficient thickness to resist fracturing during transport. In preferred embodiments the coating completely and substantially uniformly coats or enrobes the baked product. Excessive amounts of coating, especially hard butter coatings, can lead to unpleasant texture effects when the cookie is eaten. The exact percentage depends on the size and conformation of the coated base, i.e., smaller or irregular pieces take a higher percentage of coating than do larger or smooth and uniform bases. Exemplary amounts of coating may be from about 10% by weight to about 50% by weight of coating, based upon the total weight of the coated product.

The amount of coating that will adhere to a given piece is related to the viscosity of the coating. This can be controlled by varying the percentage of fat added, or, sometimes, by temperature (in the case of hard butter coatings only).

Viscosity can be lowered to get the proper coating consistency, if necessary, by adding more of the appropriate fat, e.g., cocoa butter or hardened vegetable oil. Adjustment of the amount of lecithin is also useful for viscosity control, but coating formulas usually have full lecithination (0.3 to 0.35 percent) because of the economics involved.

Fat-based coatings have the desirable property of sealing the enclosed cookie base off from the atmosphere (providing it is completely enclosed) so that loss or uptake of moisture is prevented.

Corn syrup solids, starches, and the like, are sometimes used to reduce sweetness. They also tend to reduce the cost of coatings.

The coating composition is usually at or above room temperature during the coating operation. The cookie pieces may be at a temperature of about 68° F. to about 80° F. during the coating operation. Cooling of the coated cookies can be achieved by any conventional or suitable means, for example, blown chilled air or radiant coolers.

An exemplary vanilla coating for the spherical cookies is composed of 33 parts by weight of hardened vegetable oil, 57 parts by weight of sugar, 0.1 part by weight of vanillin and 0.1 part by weight of salt. An exemplary dark chocolate coating is composed of 41.3 parts by weight of natural chocolate liquor, 41.3 parts by weight of sugar, 0.1 part by weight of salt and 17.2 parts by weight of cocoa butter. An exemplary light cocoa coating is composed of 30 parts by weight of hardened vegetable oil, 48.2 parts by weight of sugar, 14.3 parts by weight of nonfat dry milk, 0.3 parts by weight of lecithin, 0.1 part by weight of vanillin, 0.1 part by weight of salt and 7.0 parts by weight of natural cocoa. An exemplary dark cocoa coating is composed of 34 parts by weight of hardened vegetable oil, 39.5 parts by weight of sugar, 6 parts by weight of nonfat dry milk, 0.3 part by weight of lecithin, 0.1 part by weight of salt, 0.1 part by weight vanillin and 20 parts by weight of natural cocoa. An exemplary coconut coating is composed of 33 parts by weight of hardened vegetable oil, 52 parts by weight of sugar, 0.1 part by weight of salt and 15 parts by weight of coconut flour. An exemplary peanut coating is composed of 28 parts by weight of hardened vegetable oil, 32 parts by weight of sugar, 12 parts by weight of nonfat dry milk, 0.1 part by weight of salt and 28 parts by weight of peanut flour.

The spherical baked goods can be coated (for example by enrobing) with a water-icing or compositions of that type. Typically a water icing can be composed of powdered sugar, water, color and flavor or it can be a more complex mixture, such as, 100 pounds of granulated sugar, 23 pounds of water, 5 pounds of corn starch, 8 pounds of corn syrup, 44 of powdered sugar and any flavor (and optionally 24 pounds of melted chocolate liquor and 0.005 pound of vanillin). A typical flat icing composed of 100 pounds of granulated sugar, 48 pounds of water, 5 pounds of corn syrup, 0.75 pounds of gelatin and 14 pounds of powdered sugar. Water icings or flat icings are basically compositions of sugars, water and a hydrocolloid, such as, gelatin, to which can be added suitable colors and flavors.

An exemplary coating can be prepared from a marshmallow coating composition composed of 100 pounds of granulated sugar, 50 pounds of water, 40 pounds of corn syrup, 60 pounds of invert syrup and 4.5 pounds of gelatin (175 bloom). Another exemplary coating prepared from a chocolate-flavored composition composed of 100 pounds of granulated sugar, 28 pounds of water, 28 pounds of corn syrup, 4.5 pounds of gelatin, 10 pounds of cocoa (dutched; 10 to 12 percent fat) and 10 pounds of coconut oil (110° C.).

The spherical baked goods can be coated by a method very similar to the pan-coating technique used in confectionery manufacture. The apparatus may comprise a coating reel having a rotating drum. It somewhat resembles a cement mixer in having an open bowl rotating about an axis inclined to the horizontal. The particles are placed in the bowl, and, as it rotates, a molten (e.g., 250° F.) sugar syrup is slowly dripped upon the mass. Coconut oil, for example, can be added to decrease foaming in the sugar syrup and to promote separation of the coated particles. The tumbling action of the particles results in each of them remaining separate and being uniformly coated with a thin glaze of sugar which hardens upon cooling. A stream of hot air can be directed into the coating reel to speed drying. A typical syrup formula is about 86 weight percent of sucrose, about 13 weight percent of corn syrup and about 1 weight percent of salt. From about 0.01 to 0.05 weight percent of sodium acetate may be added to prevent crystallization of the coating. From about 10 to about 60 percent of the weight of the finished product may be due to the glaze.

By variation of formulation and mechanical treatment of sugar-based coating compositions, a range of coating characteristics can be obtained, from glazed or shiny to highly crystalline or frosty. Glazed coatings can be obtained by the addition of invert sugar, honey, and other nonsucrose sugars. Rather than the addition of invert sugar, some of the sucrose present may be inverted by heating the sugar syrup with an acid such as citric acid present. Crystallization can be minimized by avoiding mechanical movement or disturbance of the product during critical parts of the drying and hardening of the coating. More frosty or crystalline coatings may be obtained by using all or mostly sucrose and by providing tumbling or other agitation during the cooling and drying of the coating. Flavoring materials such as citrus oils or spices may be incorporated into the sugar coating.

Chocolate coatings which may be used include true chocolate coating or a compound coating, also called a confectioner's coating. True chocolate coatings are, for example, bitter sweet coatings, dark sweet coatings, medium dark sweet coatings, bitter chocolate coatings and milk chocolate coatings. A typical bitter sweet chocolate coating for crackers contains 40 to 49 percent of chocolate liquor, 32 to 42 percent of sugar and 36 to 48 percent of fat.

Compound or confectioner's coatings may be made using a mixture of cocoa and vegetable fat in place of chocolate liquor and cocoa butter. The ingredients, cocoa, vegetable fat, sugar and milk solids are mixed thoroughly together, refined and conched. Alternatively, the cocoa, sugar and milk solids can be ground in a pulverizer-classifier mill to a fineness of about 30μ. This mixture is then mixed with the vegetable fat until the final viscosity is reached. Compound coatings contain usually less than 10 percent of cocoa (no chocolate liquor), 40 to 50 percent of sugar, and 30 to 35 percent of fat.

The coatings compositions for crackers can contain cheeses such as softened cream cheese.

The coatings can be thickened by wheat flour, cornstarch or potato flour, for example. These thickeners can be blended with melted fat before combining with the other coating ingredients.

The coatings, for example, can contain any of the following: condensed cream of celery, chicken, mushroom, tomato or onion soup, chili powder, wine, olive oil, pineapple juice, lemon juice, finely particulated seasoning, brown, sugar, meat glaze, butter, onion juice, mustard, curry powder, cheese in fine particle form, salt, eggs, egg whites, egg yellows, evaporated milk, pureed vegetables or fruits, vitamins, minerals, corn meal, honey, butter, potato powder, vanilla extract, shortening, and the like.

The spherical baked goods of the invention can be coated with the viscous, liquefied coating formulation of U.S. Pat. No. 5,114,704, which comprises a surfactant, an effective polysaccharide gum, a binding agent, a starch carrier, and a hydrogenated vegetable oil. The pertinent parts of U.S. Pat. No. 5,114,704 are incorporated herein by reference. The coating formulation may contain a surfactant, such as, lecithin or modified lecithin, xanthan gum (or other suitable polysaccharide gum), a starch or modified food starch, hydrogenated vegetable oil and a binding agent, such as, maltodextrin, and water. Optional ingredients include fat, flavorant and colorant. A suitable humectant, such as propylene glycol, sorbitol, and glycerin can be used in the coating formulation. The coated goods may be dried after application of the coating.

The liquefied coating formulation can contain at least one suspension agent. The preferred suspension agent is polysaccharide gum, most preferably xanthan gum. From about 0.05 to 1.25 weight percent of polysaccharide gum (xanthan gum) may be used. The xanthan gum is an excellent agent for controlling the bodying effect, as it is stable over a broad temperature range, i.e., it holds the same viscosity over a large temperature range without any separation of the coating ingredients. Other suitable gums and mucilages can be used.

An adhesive or binding agent, such as, maltodextrins, may be used in the coating slurry to help the coating material bind (adhere) to the baked goods when the baked goods, for example, are dipped in the coating slurry. From about 5 to about 15 weight percent of the maltodextrin may be included in the coating material.

A carrier, such as, starch or a modified food starch, may be included in the coating formulation. From about 0.1 to about 5 weight percent of the food starch or modified food starch may be included in the coating material. The food starch or modified food starch also serves to control the viscosity.

A hydrogenated vegetable oil can be included in the coating formulation for sheen and to modify the melting point of the formula fats in the finished product. It also helps to prevent flaking of the coating.

An exemplary coating formulation may be composed of 0.5 to 2.5 weight percent, of salt, 2 to 30 weight percent, of maltodextrin, 0.1 to 10 weight percent, of modified food starch, 0.01 to 3 weight percent, of colorant, 0.01 to 5 weight percent, of flavorant, 0.5 to 1.5 weight percent, of xanthan gum, 0.5 to 1.75 weight percent, of lecithin or modified lecithin, up to 15 weight percent, vegetable fat, and water. The coating formulation usually is viscous enough so that the coating formulation generally only coats the surface regions of the baked goods.

The coating slurry may be applied to the baked goods by spraying, dipping, etc. The coating slurry may be applied generally at a temperature of 45° to 200° F., preferably at about 60° to about 190° F., (the baked goods best having been cooled, or allowed to cool, to less than 200° F.). After treating the baked goods with the coating slurry, the coated baked goods may be dried. The coated, baked goods may be air dried, or dried using applied heat, e.g., in a hot air oven at an exemplary temperature of about 75° to 300° F. for up to about 20 minutes. The coated goods can be dried to obtain products having a water activity of 0.70 or less.

The invention is further illustrated by the following examples wherein all percentages, parts, ratios and proportions are by weight, and all temperatures are in °F., unless otherwise indicated:

EXAMPLE 1

Spherical chocolate chip cookies may be prepared by extruding a cookie dough bakeable to a firm and tender texture through a plurality of circular dies into a plurality of extrudate ropes. The ropes may be severed simultaneously with a reciprocating cutter having cylindrically shaped dough forming sections into substantially cylindrical dough pieces. The ingredients and their relative amounts used to prepare the cookie dough may be:

| Dough Ingredients | Parts By Weight |
| --- | --- |
| Bleached medium wheat flour (about 12 percent weight percent of H$_2$O) | 100.0 |
| Sucrose | 29.3 |
| High fructose corn syrup | 1.56 |
| Brown sugar | 10.0 |
| Vegetable shortening | 30.0 |
| Sodium bicarbonate | 1.0 |
| Ammonium bicarbonate | 0.15 |
| Salt | 1.56 |
| Vital wheat gluten | 4.0 |
| Flavoring | 0.15 |
| Spray dried whey | 2.0 |
| Chocolate drops | 20.0 |
| Water | 17.0 |

The dough may be prepared using an upright mixer running at low speed. One-third of the sucrose, together with the shortening, high fructose corn syrup, brown sugar, salt, dried whey, vital wheat gluten and flavoring may be placed in the mixing bowl and mixed for 3 minutes to obtain a smooth consistency. The water may then be added and the mixing may be continued for 1 minute. The flour, sodium bicarbonate and ammonium bicarbonate may then be added and the mixing may be continued for a further 2 minutes. The remaining sucrose may then be added and the mixing may be continued for a further 2 minutes. Finally, the chocolate chips may be added at 60° F. (15.6° C.) and the mixing may be continued for a further 1 minute to prepare the finished chocolate chip cookie dough.

The substantially cylindrical cookie dough pieces may be leavened by baking in a jet zone oven equipped with an oscillating steel solid pan conveyer to an end point moisture content of about 2.6% by weight, based upon the weight of the cookie, and may be cooled at room temperature to obtain substantially spherical cookies having a diameter of approximately one inch. The spherical cookies may then be transferred to a pan coater and then coated with a sugar-based confectionery coating.

EXAMPLE 2

The ingredients and their relative amounts which may be used to produce a spherical cracker in accordance with the invention are:

| Ingredients | Weight Percent |
|---|---|
| Flour (wheat, about 12% H$_2$O) | 69.50 |
| Salt | 0.44 |
| Sodium bicarbonate | 0.44 |
| Ammonium bicarbonate | 0.35 |
| Malt | 1.00 |
| Sucrose | 2.78 |
| High fructose corn syrup | 1.22 |
| Sodium stearyl lactylate | 0.25 |
| Proteolytic enzyme (papain) | 0.02 |
| Lecithin | 0.25 |
| Vegetable oil | 4.98 |
| Water | 18.76 |
| TOTAL | 100.00 |

The proteolytic enzyme may be derived from papain and may exhibit essentially no amylase activity. The proteolytic activity of the enzyme composition may range from about 365 to about 385 Nu/g.

An extrudable cracker dough may be produced by creaming together the vegetable oil, lecithin, sodium stearyl lactylate, a majority of the water, the salt, sucrose, high fructose corn syrup and malt. The ingredients may be mixed for about three minutes to obtain a substantially homogeneous creamed mixture. The wheat flour and sifted sodium bicarbonate may then be admixed with the creamed mixture. The mixing may be continued for an additional 30 seconds. The ammonium bicarbonate and the proteolytic enzyme may be separately dissolved in the remaining portion of the water and separately added to the other mixed ingredients. The mixing may be continued for about another seven to eight minutes to obtain a substantially homogeneous extrudable cracker dough.

The resulting cracker dough may be permitted to lay up to about 3 hours and may then be transferred to an extruder and cutting apparatus. The extrusion may take place at a pressure of about 80 to about 180 psig and a temperature of about 80° to about 105° F.

The cylindrical raw dough pieces may then be transported by means of a conveyor belt and baked by means of a jet zone band oven at temperatures of from about 325° to about 525° F. to leaven the rounded dough pieces and obtain spherical crackers. The crackers may then be transported to a conventional confectionery pan coating apparatus and pan coated with conventional confectionery compositions, such as chocolate, or sugar-based compositions.

EXAMPLE 3

The ingredients and their relative amounts which may be used to produce a spherical cracker in accordance with the invention are:

| Ingredients | Weight Percent |
|---|---|
| Flour (wheat, about 12% H$_2$O) | 67.41 |
| Salt | 0.50 |
| Sodium bicarbonate | 0.32 |
| Ammonium bicarbonate | 0.32 |
| Malt | 1.34 |
| Sucrose | 4.46 |
| Sodium stearyl lactylate | 0.40 |
| Proteolytic enzyme (microbial) | 0.01 |
| Proteolytic enzyme (papain) | 0.01 |
| Lecithin | 0.30 |
| Vegetable oil | 5.94 |
| Water | 19.00 |
| TOTAL | 100.00 |

The proteolytic enzyme derived from papain may be the same as the proteolytic enzyme used in Example 2. The proteolytic enzyme derived from bacteria may exhibit amylytic activity but is primarily a protease. The activity of the microbial proteolytic enzyme may be from about 365 to about 385 Nu/g. The ingredients may be mixed to obtain a cracker dough using the procedure of Example 1. The papain derived proteolytic enzyme and the microbial proteolytic enzyme may be added to separate amounts of water. They may then be separately admixed with the other ingredients after addition of the ammonium bicarbonate as in Example 1 to obtain a substantially homogeneous dough.

The cracker dough may be permitted to lay, then extruded, cut, baked and pan coated as in Example 2 to obtain spherical, pan coated crackers as in Example 1.

EXAMPLES 4 AND 5

The ingredients and their relative amounts which may be used to produce rounded, glassy matrix shelf-stable half products which may be subsequently expanded or puffed to obtain crisp, savory, low calorie spherical snacks are:

| Dry Ingredients | Example 4 Weight Percent | Example 5 Weight Percent |
|---|---|---|
| Rice flour | 79.82 | 71.25 |
| Sucrose | 7.25 | 6.46 |
| Salt | 1.82 | 1.62 |
| Malt | 1.82 | 1.62 |
| Nacho flavor | 4.53 | 4.05 |
| Modified starch (Baka-snak) | 4.76 | 15.00 |
| TOTAL | 100.00 | 100.00 |

The dry ingredients for Examples 4 and 5 may be fed to a Mapimpianti extruder modified to have a plurality of circular shaped dies or die inserts.

The extruder may contain three chambers or sections. In the first chamber, the dry ingredients may be mixed and preconditioned to a moisture content of about 29 percent by weight, based upon the total weight of the composition. The composition may then be permitted to flow into the second chamber. This section of the extruder may comprise four temperature zones, which are heated via electrical barrels. The temperature profile for the four zones may be set to 70° C., 95° C., 115° C. and 120° C., respectively. In the second chamber, the preconditioned material may be gelatinized and may be conveyed by what is known as a gelatinization screw, or "G" screw. The cooked composition may then be conveyed into the third chamber. As it enters the third chamber, the cooked composition may be cut into pieces by a small rotary blade. The third chamber may be equipped with paddles for pushing the composition through a forming section and out of the plurality of dies. The third chamber may be equipped with a vacuum for controlling the moisture content of the extrudates to a level which facilitates forming and cutting. In Example 4, the composition may be extruded at a rate of about 141 grams/min. and in Example 5 the rate may be about 137 grams/min. The extrudate ropes may then be cut into rounded cylindrical pieces as in Example 2. The rounded dough pieces may then be dried and conditioned at a temperature of about 25° C. and at a relative humidity of about 50 percent until equilibrium is reached.

The rounded shelf stable, glassy matrix half products may be puffed and expanded by subjecting them to microwaving on high for about 50 seconds, followed by heating at 350° to about 400° F. for about 30 seconds in a jet zone oven to obtain spherically shaped snacks which are baked or cooked substantially uniformly. The snacks may be coated with a sugar-based or oleaginous-based coating composition by spraying them in a rotating drum.

What is claimed is:

1. A method for the production of baked goods comprising:
   (a) feeding a farinaceous based dough through at least one die to obtain at least one shaped extrudate dough rope,
   (b) cutting each of the shaped extrudate ropes to obtain cylindrical or substantially spherical dough pieces,
   (c) Conveying the cylindrical or substantially spherical dough pieces through an oven by means of a conveyer while moving the cylindrical or substantially spherical dough pieces relative to the conveyer so as to promote the production of spherical dough pieces, and
   (d) heating the dough pieces while moving the dough pieces relative to the conveyer to leaven the dough pieces into substantially spherical or ellipsoidal baked goods.

2. A method as claimed in claim 1 wherein said farinaceous-based dough is fed through said at least one die by an extruder comprising a plurality of screw feeds.

3. A method as claimed in claim 1 wherein ingredients of said farinaceous-based dough are mixed in a continuous mixer to obtain said farinaceous-based dough, and said farinaceous-based dough is transferred to at least one extruder or at least one pair of counter-rotating rolls each equipped with a plurality of dies to obtain a plurality of said shaped extrudate ropes.

4. A method as claimed in claim 1 wherein ingredients of said farinaceous-based dough are mixed in a batch mixer to obtain said farinaceous-based dough, and said farinaceous-based dough is transferred to at least one extruder or at least one pair of counter-rotating rolls each equipped with a plurality of dies to obtain a plurality of said shaped extrudate ropes.

5. A method as claimed in claim 1 wherein said spherical baked pieces are coated with a confectionery coating by pan coating.

6. A method as claimed in claim 1 wherein said spherical dough pieces are leavened in a fluidized bed or jet zone oven.

7. A method as claimed in claim 1 wherein said farinaceous-based dough is a cookie dough.

8. A method as claimed in claim 1 wherein said farinaceous-based dough is a cracker dough.

9. A method as claimed in claim 1 where said farinaceous-based dough is partially cooked, and then the extrudate ropes are cut into partially baked cylindrical or substantially spherical dough pieces which are then conveyed through said oven by said conveyor for leavening into substantially spherical baked goods.

10. A method as claimed in claim 1 wherein said extrudate dough ropes are cut by a reciprocating cutter which severs and shapes the dough into cylindrical or substantially spherical dough pieces.

11. A method as claimed in claim 1 wherein said dough pieces are heated in said oven at a temperature of at least about 250° F.

12. A method as claimed in claim 1 wherein said dough comprises flour and about 2% by weight to about 7% by weight gluten, based upon the weight of the flour.

13. A method as claimed in claim 7 wherein said cookie dough comprises flour and about 2% by weight to about 7% by weight gluten, based upon the weight of the flour.

* * * * *